Figure 1:
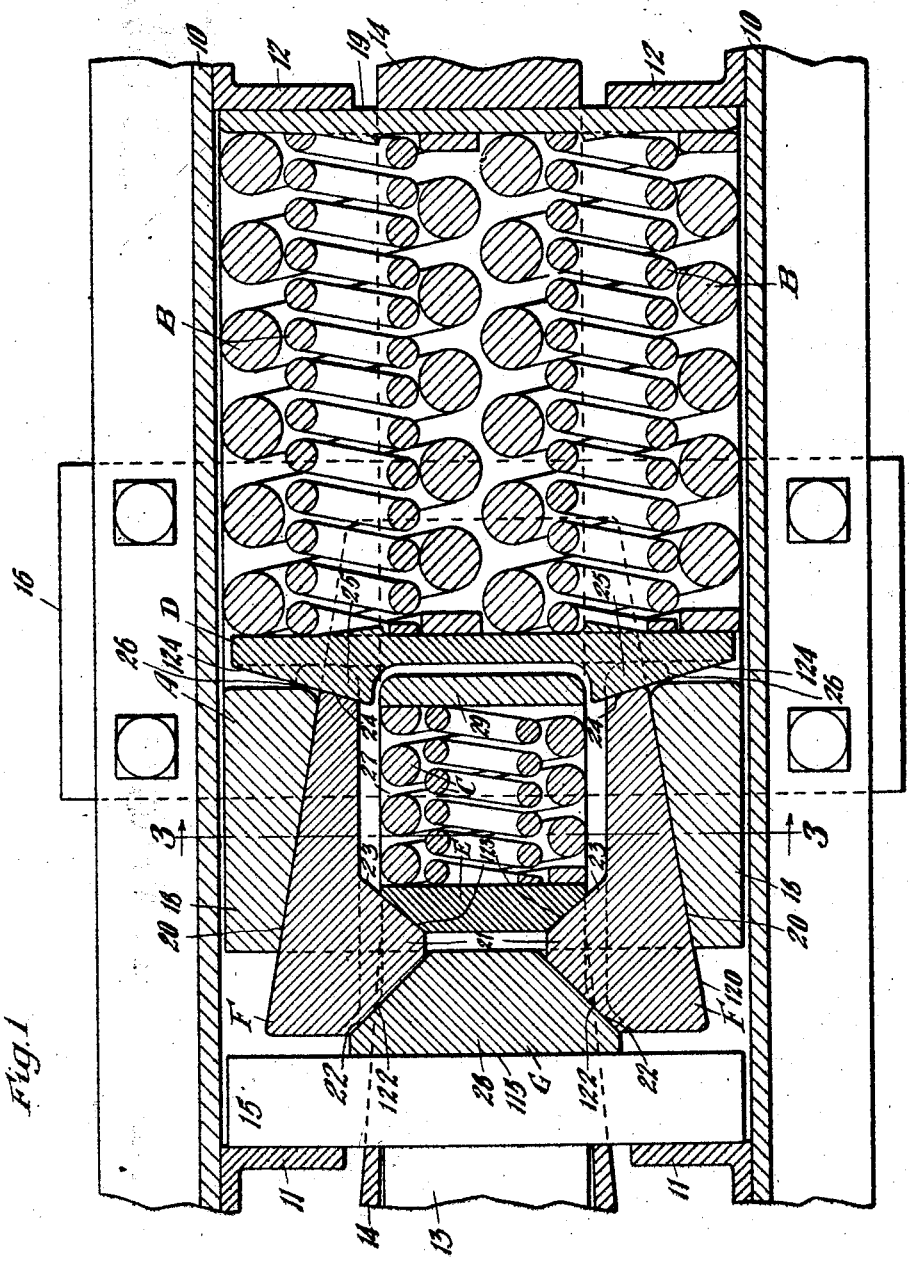

March 30, 1926. 1,578,312
S. B. HASELTINE
FRICTION SHOCK ABSORBING MECHANISM
Filed Feb. 9, 1924 2 Sheets-Sheet 1

Witnesses
Wm Geiger

Inventor
Stacy. B. Haseltine
By George J. Haight
Atty.

March 30, 1926.
S. B. HASELTINE
1,578,312
FRICTION SHOCK ABSORBING MECHANISM
Filed Feb. 9, 1924   2 Sheets-Sheet 2
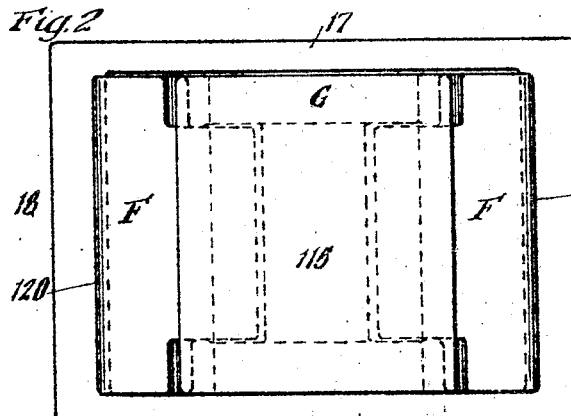
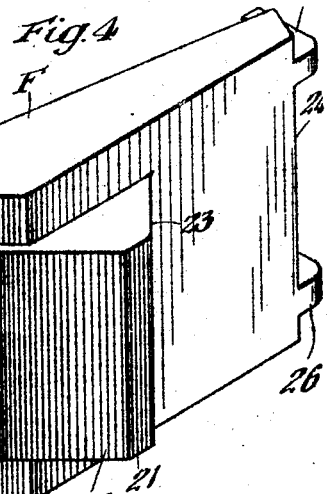
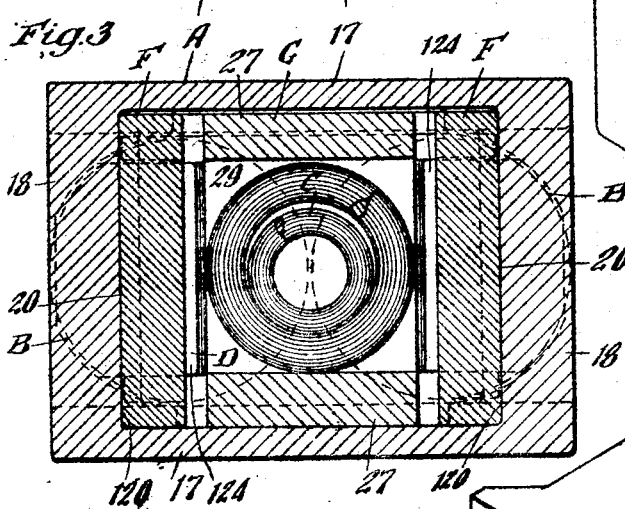
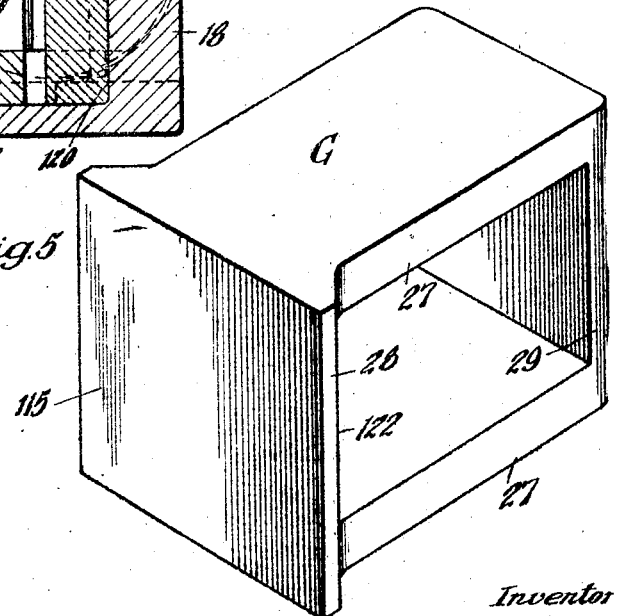
Witnesses
Wm. Geiger
Inventor
Stacy B. Haseltine
By George I. Haight
His Atty.

Patented Mar. 30, 1926.

1,578,312

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed February 9, 1924. Serial No. 691,578.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, having high frictional resistance and certain release, and wherein a differential wedge action is had during the compression of the mechanism.

Another object of the invention is to provide a mechanism of the character indicated, including a plurality of differential wedge elements with which coact main spring resistance elements, wherein additional capacity is obtained by employing independent, auxiliary spring means also resisting movement of the wedge elements.

Other objects and advantages of the invention will more clearly appear from the description and claims hereinafter following.

In the drawings forming a part of this specification, Figure 1 is a horizontal, longitudinal, sectional view of a portion of a railway draft rigging showing my improvements in connection therewith. Figure 2 is a front end elevation of the shock absorbing mechanism proper. Figure 3 is a vertical, transverse, sectional view corresponding substantially to the line 3—3 of Figure 1. And Figures 4 and 5 are detail, perspective views of one of the friction shoes and the combined yoke and wedge member respectively.

In said drawing, 10—10 denote the usual channel draft sills of a railway car underframe, to the inner faces of which are secured front stop lugs 11 and rear stop lugs 12. A portion of the drawbar is indicated at 13, the same being operatively associated with the shock absorbing mechanism proper by a hooded cast yoke 14, within which is disposed said mechanism and also a front follower 15. The yoke and parts therewithin are supported in operative position by a detachable saddle plate 16.

The improved shock absorbing mechanism proper, as shown, comprises broadly, a combined friction shell and spring cage casting A; twin arranged main spring resistance elements B—B; an auxiliary spring resistance C; a main spring follower D; an auxiliary spring follower E; a pair of wedge friction shoes F—F and a combined yoke and pressure-transmitting wedge member G.

The casting A, as shown, is formed with top and bottom walls 17—17, side walls 18—18 and an integral rear wall 19, the latter functioning as the rear follower of the mechanism. The side walls 18 are left comparatively short so as to leave the major portion of the sides of the casting open to permit the insertion and removal of certain parts. The side walls 18 are provided on their inner faces with longitudinally extending friction surfaces 20—20 which are converged inwardly of the shell.

The friction wedge shoes F are of like construction, each being provided on its outer side with a longitudinally extending friction surface 120 cooperable with the corresponding shell friction surface 20. On its inner side, that is, the side nearest the axis of the shell, each shoe is provided with a lateral enlargement 21 having on its front side, an outer wedge face 22 and on its rear side an inner wedge face 23. The wedge face 23 is preferably inclined at a blunter angle with reference to the longitudinal axis of the mechanism than the face 22. At its inner end, each shoe F is provided with a beveled face 24, the beveled faces 24 diverging inwardly of the mechanism and cooperating with correspondingly inclined faces 124 on enlargements 25 provided on the front side of the twin spring follower D. At the rear end, each shoe is also provided with a pair of rearwardly disposed, laterally extending, spaced lugs 26, adapted to engage behind the corresponding side wall 18 of the shell, thereby limiting the outward movement of each shoe and maintaining the parts in assembled relation. As most clearly shown in Figure 4, the upper and lower ends of the enlargements 21 are spaced respectively from the corresponding edges of the shoes, so that they will work freely within the yoke G.

The yoke G comprises parallel top and bottom arms 27 and front and rear end sections 28 and 29. The arms 27 are adapted to embrace the projections 21 of the shoes and slide freely thereover. The section 28 is provided on the inner side thereof with a pair of rearwardly converging wedge faces 122—122 adapted to coact respectively with the wedge faces 22 of the shoes. At the front end, the yoke G is provided with a flat, transverse face 115 adapted to abut the front follower 15. As clearly shown in Figure 3, the upper and lower walls 17 of the shell are properly recessed to accommodate the top and bottom portions of the yoke G and the shoes F for sliding movement inwardly of the shell.

The main spring resistance elements B are twin arranged, each comprising an inner relatively light coil and an outer relatively heavier coil bearing on the rear wall of the shell and the rear face of the main spring follower D respectively.

The spring follower E is in the form of a rectangular plate having wedge faces 123 at the opposite sides edges thereof adapted to coact respectively with wedge faces 23 of the shoes F. The spring resistance C which also comprises a relatively light coil and a relatively heavier outer coil is interposed between the spring follower E and the rear end section 29 of the yoke G.

In assembling the mechanism, the spring resistance C, spring follower E and the shoes F are first assembled with the yoke G, and while the parts are compressed by means of a clamp placed across shoes near the outer end thereof, so that the lugs 26 will clear the side walls 18 of the shell, the assembled members are inserted between the walls 18 and upon expansion of the same, the lugs 26 are engaged behind the walls 18. The main spring follower D and the spring resistance elements B are inserted within the shell A through the openings provided in the opposite sides thereof. In the normal position shown in Figure 1, both springs B and C are held under a certain amount of compression.

The operation of the mechanism is as follows, assuming an inward or compression movement of the drawbar. As the pressure is transmitted through the combined yoke and wedge G, the shoes F are forced inwardly of the mechanism and against the side walls 18 of the shell. As the shoes F are carried inwardly against the resistance of the twin arranged springs B, they are forced toward the axis of the mechanism, due to the taper of the inwardly converging friction surface 20 of the shell, thereby producing a differential wedge action, the faces 23 and 24 of the shoes slipping on the faces 123 and 124 of the spring followers E and D, and the faces 22 of the shoes slipping on the faces 122 of the wedge member G. Inward movement of the follower 15 is limited by engagement with the front end of the shell when the mechanism is fully compressed, the forces then being transmitted directly through the shell, which acts as a column-load-sustaining means. Upon removal of the actuating force, the parts will be restored to their normal position by the expansion of the spring resistance elements B and C, outward movement of the shoes F being limited by the lugs 26 as hereinbefore pointed out.

Wear of the various wedge and friction faces is compensated for by placing the springs C under preliminary compression when the parts of the mechanism are assembled.

I have herein shown and described what I now consider the preferred manner of carrying out my invention but the same is merely illustrative and I contemplate all changes and modifications that come within the scope of the claims appended hereto.

I claim:

1. In a friction shock absorbing mechanism, the combination with a friction shell having interior friction surfaces; of friction shoes coacting with said shell friction surfaces; a yoke receiving the actuating force and transmitting force to the shoes, said yoke having wedge means thereon coacting with said shoes; and means for yieldingly resisting movement of said shoes, said means including a spring element coacting with said yoke.

2. In a friction shock absorbing mechanism, the combination with a friction shell having inwardly converging interior friction surfaces; of friction shoes coacting with said shell friction surfaces; a wedge pressure-transmitting member coacting with said shoes; abutment means on said member; and spring resistance elements coacting with said shoes to resist movement thereof inwardly of the shell, certain of said elements being operatively interposed between said shoes and abutment means.

3. In a friction shock absorbing mechanism, the combination with front and rear follower acting means, one of said follower acting means having converging friction surfaces thereon; a pressure transmitting member coacting with the other of said follower acting means, said member having wedge faces; friction shoes coacting with said friction surfaces, said shoes having wedge faces thereon engaged by the wedge faces of said member; a spring resistance element operatively interposed between one of said follower acting means and said shoes; and an additional spring resistance element opposing inward movement of said shoes, said last-named spring resistance element being interposed between said pressure transmitting member and said shoes.

4. In a friction shock absorbing mechanism, the combination with end follower acting means, one of said follower acting means including a friction shell having interior friction surfaces, of a differential wedge system coacting with said shell, said system including a wedge pressure-transmitting member movable in unison with the other follower and friction shoes; and spring resistance elements opposing movement of said shoes inwardly of the shell, one of said elements being interposed between the shoes and shell and the other of said elements being interposed between said shoes and wedge-pressure-transmitting member.

5. In a friction shock absorbing mechanism, the combination with a friction shell having interior friction surfaces; of a differential wedge system coacting with said shell friction surfaces, said system including friction shoes and a combined yoke and wedge member; and a spring resistance element opposing relative movement of said yoke and shoes; and a second spring resistance element opposing relative movement of the shell and shoes.

6. In a friction shock absorbing mechanism, the combination with a friction shell having interior, inwardly converging friction surfaces; of wedge friction shoes coacting with said surfaces; a yoke having wedge means thereon engaging said shoes; a main spring follower acting with said shoes, an auxiliary spring follower coacting with said shoes; a spring resistance element coacting with said main spring follower and an auxiliary spring resistance disposed within said yoke, and co-operating with said auxiliary spring follower.

7. In a friction shock absorbing mechanism, the combination with a friction shell having converging interior friction surfaces; of a pressure-transmitting yoke having wedge means thereon; friction shoes coacting with said surfaces, each of said shoes having a plurality of wedge faces thereon, one of which is adapted to be engaged by said wedge means; a pair of spring followers coacting with said shoes, each of said spring followers having a wedge face thereon adapted to coact with one of the remaining wedge faces of each shoe; a main spring resistance element within said shell coacting with one of said followers; and an auxiliary spring resistance within said yoke coacting with the other spring follower.

8. In a friction shock absorbing mechanism, the combination with a friction shell having inwardly converging, interior friction surfaces; of a yoke; friction shoes coacting with the shell friction surfaces, said shoes and yoke having coacting wedge means thereon; means for yieldingly resisting movement of said shoes inwardly of the shell, said last named means including a spring resistance element disposed within said yoke; and coacting abutment means on said shell and shoes for limiting the outward movement of the latter.

9. In a friction shock absorbing mechanism, the combination with a friction shell having inwardly converging interior friction surfaces; of a yoke member; friction shoes coacting with said friction surfaces, said shoes and yoke having coacting wedge faces thereon; a pair of spring followers engaging said shoes; twin arranged spring resistance elements within the shell coacting with one of said spring followers; and a spring resistance element disposed within the yoke and coacting with the remaining spring follower.

10. In a friction shock absorbing mechanism, the combination with a friction shell having interior, converging friction surfaces; of a yoke; friction shoes coacting with said shell friction surfaces, said shoes and yoke having coacting wedge means thereon; means for yieldingly resisting inward movement of said shoes, said means including a spring resistance element disposed within said yoke; and a spring resistance co-operating with the shell and a coacting spring follower, said spring follower and shoes having coacting wedge faces thereon.

11. In a friction shock absorbing mechanism, the combination with a friction shell having interior, inwardly converging friction surfaces; of a yoke member; friction shoes coacting with said friction surfaces, said shoes and yoke having coacting wedge means thereon; means for yieldingly resisting movement of said shoes inwardly of the shell, said means including spring elements disposed within said yoke and shell respectively; and a spring follower interposed between said shoes and the spring resistance element within the shell, said spring follower and shoes having coacting wedge faces thereon.

12. In a friction shock absorbing mechanism, the combination with a laterally contractible and longitudinally expansible friction unit including a pressure-transmitting wedge, friction shoes and a spring housed within the unit, said spring being compressible in a longitudinal direction when the unit is contracted laterally, the spring being also bodily movable with the unit; of a friction shell having friction surfaces cooperable with the friction shoes of said unit and arranged to compel lateral contraction of the latter when the unit is moved inwardly with respect to the shell; and a main spring resistance for yieldingly resisting relative movement between the said unit and said shell.

In witness that I claim the foregoing I have hereunto subscribed my name this 6th day of February, 1924.

STACY B. HASELTINE.